June 13, 1933.  R. M. BRASKET  1,914,004
POT MAKING APPARATUS
Filed Aug. 4, 1931   3 Sheets-Sheet 1

INVENTOR
Robert M. Brasket
by
Bradley & Lee
atty

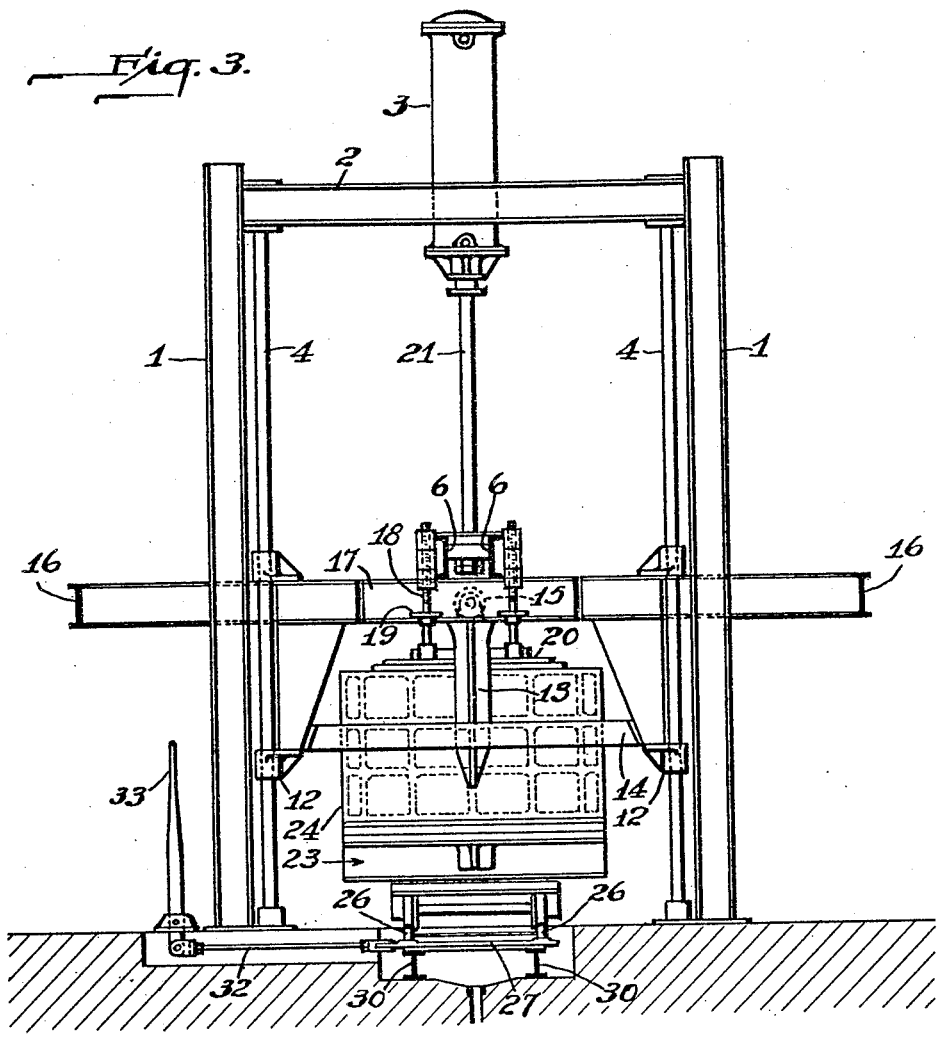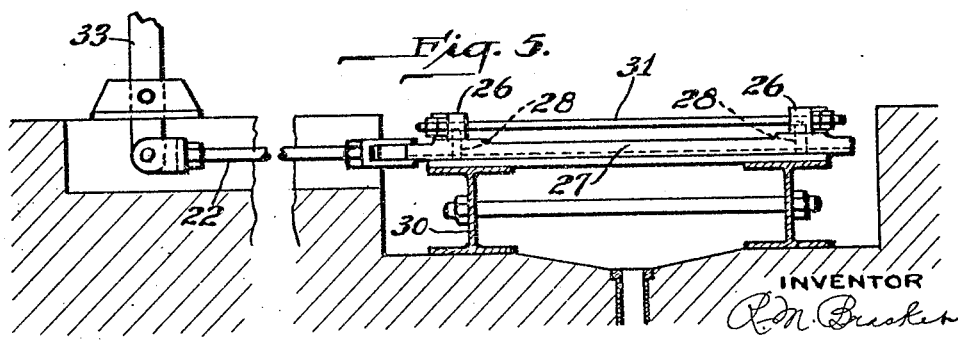

Patented June 13, 1933

1,914,004

UNITED STATES PATENT OFFICE

ROBERT M. BRASKET, OF CRYSTAL CITY, MISSOURI, ASSIGNOR TO PITTSBURGH PLATE GLASS COMPANY, A CORPORATION OF PENNSYLVANIA

POT MAKING APPARATUS

Application filed August 4, 1931. Serial No. 554,975.

Figure 1:
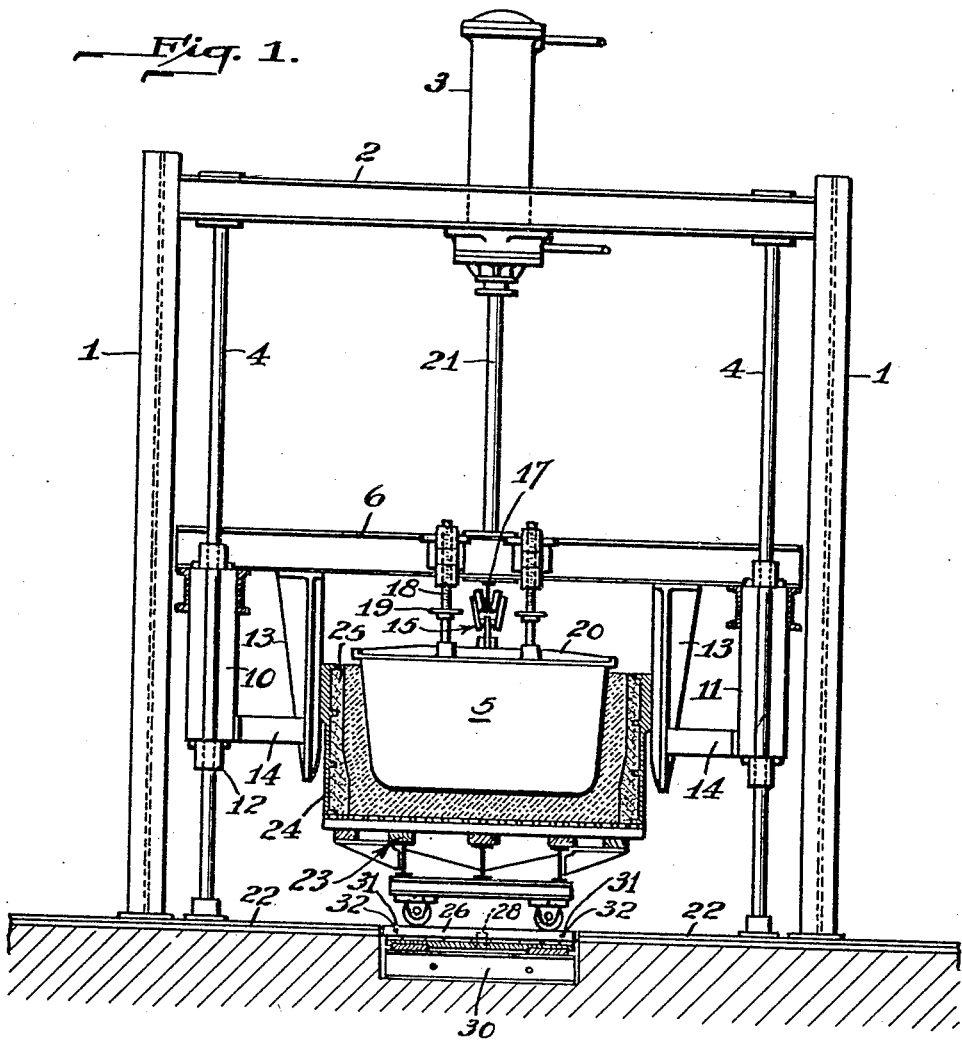
Figure 6:
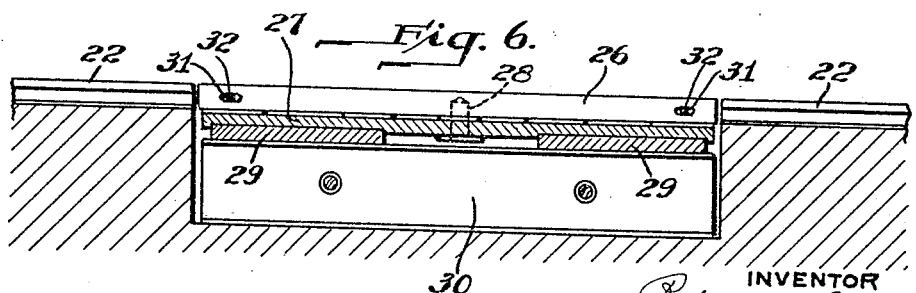
Figure 2:
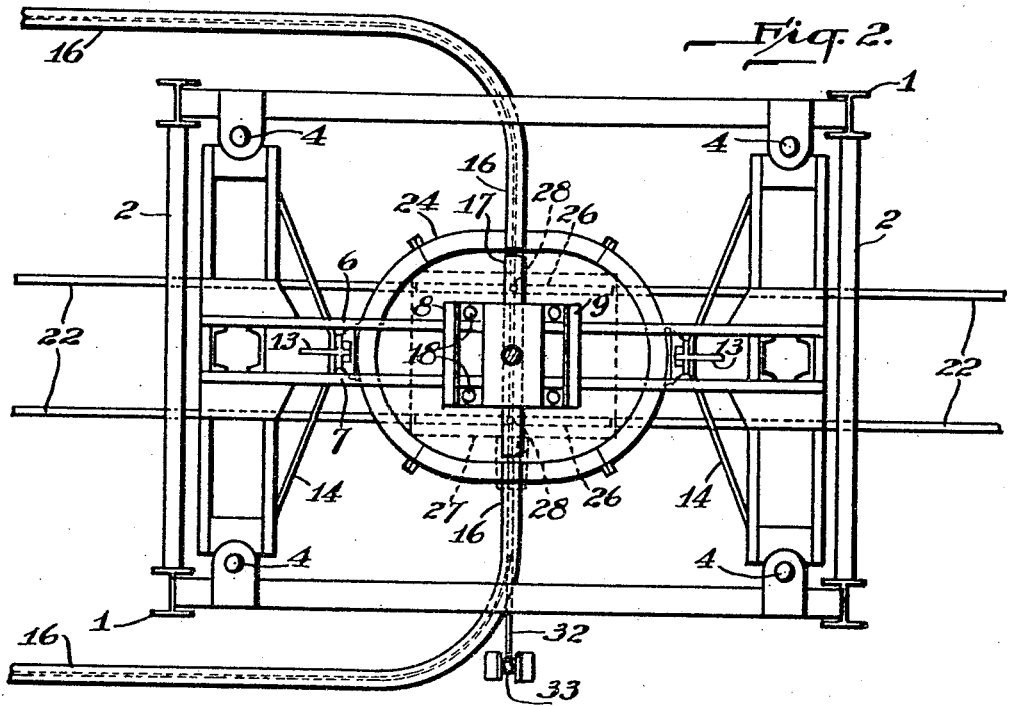
Figure 4:
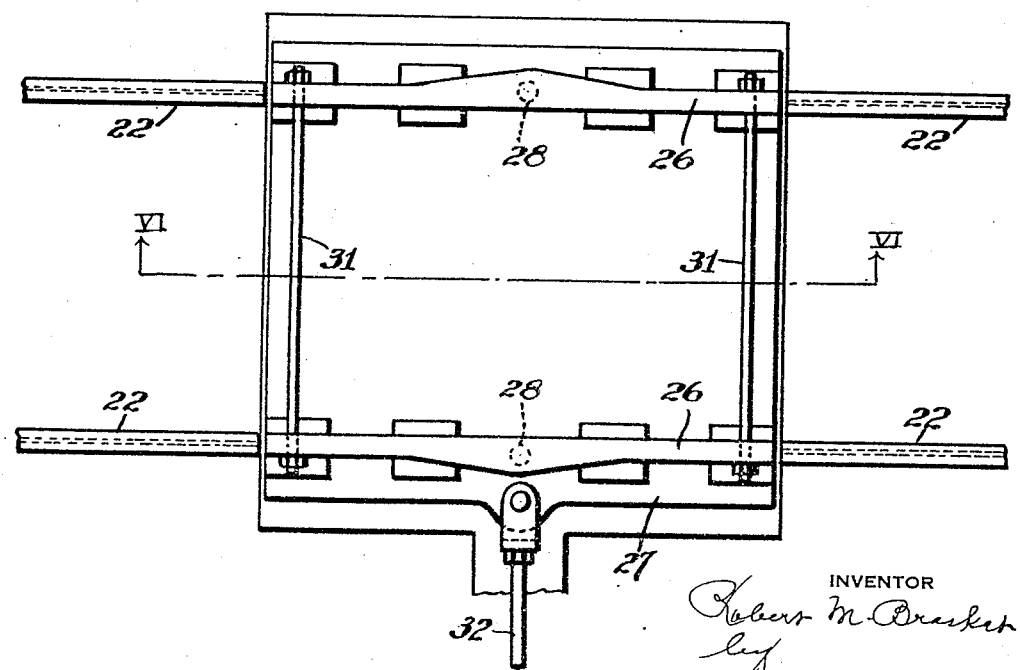

The invention relates to pot making apparatus and particularly to apparatus for making the so-called poured pots for use in the manufacture of plate and optical glass. The invention has for its objects the provision of improved apparatus for molding the semi-fluid clay so that the pots may be made more accurately and expeditiously than has heretofore been the case. More specifically the invention has in part to do with the means for insuring, in an effective and convenient way, the centering of the pot with respect to the plunger which is forced down into the semi-fluid clay after it has been poured into the mold. One embodiment of the invention is illustrated in the accompanying drawings, wherein:

Figure 1 is a side elevation partially in section of the improved apparatus. Fig. 2 is a plan view. Fig. 3 is an end elevation. And Figs. 4, 5 and 6 are detail views, Fig. 4 being a plan view, Fig. 5 an end view, and Fig. 6 a section on the line VI—VI of Fig. 4.

Referring to the drawings, 1 is a framework consisting of commercial sections and including a cross member 2 upon which is mounted a hydraulic cylinder 3. The framework also supports four vertical guide rods 4 upon which is mounted a cross-head for supporting the mold plunger 5. This crosshead is made up of a plurality of members 6, 7, 8, 9, 10 and 11 (Figs. 1 and 2) provided with suitable guide collars 12 slidably engaging the rods 4. The cross-head also carries a pair of downwardly projecting arms 13, 13 for centering the pot mold, as later described, such arms being braced at their lower ends by the members 14, 14.

The mold plunger is brought to its position of use, as indicated in Fig. 1, upon the trolley 15 upon which it is releasably suspended, such trolley being adapted to move along the approach sections 16, 16 (Fig. 2) and the section 17 which is carried by the cross-head. In the operation of forcing the plunger downward into the mold, it is necessary to transmit force from the cross-head to the mold plunger independent of the trolley and in order to accomplish this function, four rods 18 are employed which are threaded into the cross-head and provided with hand wheels, such rods being adapted to engage the metal cover plate 20 of the mold plunger at their lower ends. The crosshead is moved up and down by means of the rod 21 connected at its upper end to a plunger lying in the hydraulic cylinder 3.

Extending transversely beneath the crosshead is the track 22 on which is mounted a truck 23, such truck carrying the pot mold which is of any approved design preferably comprising a metal shell 24 put together in sections, which sections carry on their inner faces a lining 25 of plaster of paris, this being a mold construction which is well-known in the art. Immediately below the center of the cross head is a track section comprising the rails 26, 26 (Figs. 4, 5 and 6) mounted upon a slide plate 27 for movement transversely of the track 22, the purpose of this mounting being to permit more exact centering of the truck and mold with respect to the mold plunger 5. The rails 26, 26 are secured to the plate 27 by means of the pins 28, 28 and the plate 27 is slidably mounted upon the plates 29, 29 (Fig. 6), such plates 29, 29 being in turn secured to a pair of channels 30, 30. The rails 26, 26 are secured together by a pair of tie rods 31, 31 whose ends extend through slots 32, 32 in the rails. The rectangle formed of the rails 26, 26 and tie rods 31, 31 is capable of a slight rocking movement on the pins 28, 28 due to the fact that there is some spring in the parts and this capability of rocking movement assists in permitting the centering of the truck and pot mold with respect to the pot plunger 5 when the parts are moved to the position indicated in Fig. 1 with the centering arms in engagement with the sides of the pot mold. The arms 13 are of the cross section indicated in Fig. 2, being relatively rigid with their inner flanges fitting snugly in suitable grooves in the side walls of the pot mold. The sliding plate 27 is movable on the guide plates 29, 29 by means of the connecting rod 32 pivoted at one end to the edge of the plate 27 and at its other end to the lower end of the lever 33.

In operation, the plunger 5 is brought to the position shown in Fig. 1 by means of the trolley riding upon the trolley tracks 16 and 17. The crosshead is then raised by means of the hydraulic cylinder 3 until the plunger 5 lies at a position high enough to give clearance for the positioning of the pot mold. The pot mold is filled at some point remote from the pressing apparatus with a body of semi-fluid clay sufficient to form the pot and is moved on the truck 23 along the tracks 22 and 26 to the position shown in Fig. 1 directly beneath the plunger 5. The thrust rods 18 are now adjusted by means of the hand wheels 19 until their lower ends engage the plate 20 with the axis of the plunger in a true vertical position. The plunger is now lowered and the flanges of the guide arms 13 are caused to engage the slots or guideways in the side walls of the mold and the plunger 5 is pressed down into the clay causing it to rise and fill the mold. During this movement the mold is caused to assume a position in which it is exactly centered with respect to the mold plunger by reason of the engagement of the guide arms 13, 13 with the guide slots in the side walls of the pot. After the clay in the mold has set sufficiently to maintain its shape, the plunger 5 is withdrawn and the pot on its truck is removed to the drying room, thus completing the cycle of operation.

It will be apparent from the foregoing that the apparatus provides for the formation of pots in an accurate and convenient manner, the guide arms 13, 13 serving to insure an exact centering of the pot with respect to the plunger without the necessity of making adjustments and measurements in order to insure that the parts are in their proper relative position. A considerable amount of time is thus saved and the pots produced are of uniform construction throughout. The convenience in operation incident to the use of the tracks and trolley in conjunction with the rods 18 will be readily apparent to those skilled in the art.

What I claim is:

1. In combination in a pot making apparatus, a cross-head guided for vertical movement, power means for raising and lowering the cross-head, a track leading beneath the cross-head, a truck thereon carrying a pot mold, having guideways on its opposite sides, a track section beneath the center of the cross-head mounted for free movement transversely of the rest of the track, a mold plunger carried centrally of the cross-head, and a pair of centering arms projecting downwardly from the cross-head on opposite sides of the plunger and adapted to engage said guideways and center the mold and truck with respect to said plunger.

2. In combination in pot making apparatus, a cross-head guided for vertical movement, power means for raising and lowering the cross-head, a track leading beneath the cross-head, a truck thereon carrying a pot mold having guideways on its opposite sides, a trolley track section carried by the lower side of the cross-head, another trolley track section leading to said first track section, a trolley mounted for movement on said trolley track sections, a mold plunger suspended on the trolley, and a pair of centering arms projecting downwardly from the cross-head on opposite sides of the plunger and adapted to engage said guideways and center the mold and truck with respect to said plunger.

3. In combination in pot making apparatus, a cross-head guided for vertical movement, power means for raising and lowering the cross-head, a track leading beneath the cross-head, a truck thereon carrying a pot mold having guideways on the opposite sides, a track section beneath the center of the cross-head mounted for free movement transversely of the rest of the track, adjustable thrust means carried by the cross-head and adapted to engage the mold plunger when such plunger is positioned centrally of the cross-head, and a pair of centering arms projecting downwardly from the cross-head on opposite sides of the plunger and adapted to engage said guideways and center the mold and truck with respect to said plunger.

4. In combination in pot making apparatus, a cross-head guided for vertical movement, power means for raising and lowering the cross-head, a track leading beneath the cross-head, a truck thereon carrying a pot mold having guideways on its opposite sides, a track section beneath the center of the cross-head mounted for free movement transversely of the rest of the track, means for moving said track section, a mold plunger carried centrally of the cross-head, and a pair of centering arms projecting downwardly from the cross-head on opposite sides of the plunger and adapted to engage said guideways and center the mold and truck with respect to said plunger.

5. In combination in pot making apparatus, a cross-head guided for vertical movement, power means for raising and lowering the cross-head, a track leading beneath the cross-head, a truck thereon carrying a pot mold having guideways on its opposite sides, a track section beneath the center of the cross-head mounted for free movements transversely of the rest of the track, and for limited rocking movement, means for moving said track section transversely, a mold plunger carried centrally of the cross-head, and a pair of centering arms projecting downwardly from the cross-head on opposite sides of the plunger and adapted to engage said guideways and center the mold and truck with respect to said plunger.

6. In combination in pot making apparatus, a cross-head guided for vertical movement, power means for raising and lowering the cross-head, a track leading beneath the cross-head, a truck thereon carrying a pot mold having guideways on its opposite sides, a track section beneath the center of the cross-head mounted for free movement transversely of the rest of the track, and thrust means carried by the cross-head and adapted to engage the mold plunger when such plunger is positioned on the supporting trolley centrally of the cross-head.

7. In combination in pot making apparatus, a cross-head guided for vertical movement, power means for raising and lowering the cross-head, a track leading beneath the cross-head, a truck thereon carrying a pot mold having guideways on its opposite sides, a track section beneath the center of the cross-head mounted for free movement transversely of the rest of the track, and thrust means carried by the cross-head and adapted to engage the mold plunger when such plunger is positioned on its supporting trolley centrally of the cross-head, said thrust means consisting of a plurality of rods threaded into the lower side of the cross-head and adapted to engage the top of the mold plunger.

In testimony whereof, I have hereunto subscribed my name this 6th day of July, 1931.

ROBERT M. BRASKET.